US009838947B2

United States Patent
Bosch et al.

(10) Patent No.: US 9,838,947 B2
(45) Date of Patent: *Dec. 5, 2017

(54) MOBILE NODE HOST ROUTE INSTALLATION AND WITHDRAWAL

(71) Applicant: Juniper Networks, Inc., Sunnyvale, CA (US)

(72) Inventors: Hendrikus G. P. Bosch, Aalsmeer (NL); Martin Djernaes, Roskide (DK)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/018,687

(22) Filed: Feb. 8, 2016

(65) Prior Publication Data

US 2016/0157160 A1 Jun. 2, 2016

Related U.S. Application Data

(63) Continuation of application No. 14/543,754, filed on Nov. 17, 2014, now Pat. No. 9,258,762, which is a
(Continued)

(51) Int. Cl.
*H04W 88/06* (2009.01)
*H04L 12/46* (2006.01)
(Continued)

(52) U.S. Cl.
CPC ......... *H04W 40/34* (2013.01); *H04L 12/4641* (2013.01); *H04L 45/02* (2013.01);
(Continued)

(58) Field of Classification Search
CPC . H04L 12/46; H04L 12/4641; H04L 12/4675; H04L 12/4604; H04L 12/4633
See application file for complete search history.

(56) References Cited

U.S. PATENT DOCUMENTS 7,389,534 B1 * 6/2008 He .................................. 726/15
7,675,912 B1 3/2010 Ward et al.
(Continued)

FOREIGN PATENT DOCUMENTS

CN 102006676 A 4/2011

OTHER PUBLICATIONS

European Search Report from European patent application No. 13153046.1, dated May 13, 2013, 7 pp.
(Continued)

*Primary Examiner* — Ayaz Sheikh
*Assistant Examiner* — Debebe Asefa
(74) *Attorney, Agent, or Firm* — Shumaker & Sieffert, P.A.

(57) ABSTRACT

In general, techniques are described for atomically installing and withdrawing host routes along paths connecting network routers to attenuate packet loss for mobile nodes migrating among wireless LAN access networks and a mobile network. In some examples, whenever the mobile node moves from one attachment point to the next, it triggers the distribution of its host route from the new attachment point toward the service provider network hub provider edge (PE) router that anchors the mobile node on a service provider network. Routers participating in the Mobile VPN install the host route "atomically" from the attachment point to the mobile gateway so as to ensure convergence of the network forwarding plane with the host route toward the new attachment point prior to transitioning mobile node connectivity from a previous attachment point.

19 Claims, 9 Drawing Sheets

Related U.S. Application Data continuation of application No. 13/536,740, filed on Jun. 28, 2012, now Pat. No. 8,891,450.

(60) Provisional application No. 61/595,587, filed on Feb. 6, 2012, provisional application No. 61/598,585, filed on Feb. 14, 2012.

(51) Int. Cl.

| | | |
|---|---|---|
| *H04L 29/12* | (2006.01) | |
| *H04L 12/751* | (2013.01) | |
| *H04L 12/757* | (2013.01) | |
| *H04W 40/36* | (2009.01) | |
| *H04W 40/34* | (2009.01) | |
| *H04L 12/715* | (2013.01) | |
| *H04W 40/24* | (2009.01) | |
| *H04W 84/12* | (2009.01) | |

(52) U.S. Cl.
CPC ............ *H04L 45/023* (2013.01); *H04L 45/64* (2013.01); *H04L 61/2007* (2013.01); *H04W 40/248* (2013.01); *H04W 40/36* (2013.01); *H04W 84/12* (2013.01); *H04W 88/06* (2013.01)

(56) References Cited

U.S. PATENT DOCUMENTS

| | | | |
|---|---|---|---|
| 8,089,897 | B2 | 1/2012 | Qian et al. |
| 8,127,350 | B2 | 2/2012 | Wei et al. |
| 8,891,450 | B2 | 11/2014 | Bosch et al. |
| 9,258,762 | B2 | 2/2016 | Bosch et al. |
| 2008/0002607 | A1 | 1/2008 | Nagarajan et al. |
| 2008/0151868 | A1 | 6/2008 | Kezys |
| 2009/0016361 | A1 | 1/2009 | Serbest et al. |
| 2009/0310535 | A1* | 12/2009 | Anumala et al. ............. 370/328 |
| 2010/0177674 | A1 | 7/2010 | Aggarwal |
| 2012/0155329 | A1 | 6/2012 | Shaffer et al. |
| 2013/0031271 | A1 | 1/2013 | Bosch et al. |
| 2013/0054763 | A1 | 2/2013 | Van der Merwe et al. |

OTHER PUBLICATIONS

3GPP TS 23.234 V6.10.0, 3rd Generation Parnership Project, Technical Specification Group Services and System Aspects; 3GPP System to Wireless Local Area Network (WLAN) interworking; System description (Release 6), Sep. 2006, 75 pp.
3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.
3GPP TS 23.402 V10.4.0, 3rd Generation Partnership Project; Technical Specification Group Services and System Aspects; Architecture enhancements for non-3GPP accesses, (Release 10 ), Jun. 2011, 231 pp.
Arkko et al., "Enhanced Route Optimization for Mobile IPv6," Network Working Group, RFC 4866, May 2007, 51 pp.
Bates et al, "Multiprotocol Extensions for BGP-4," RFC 2858, Jun. 2000, 11 pp.
Bhagavathula et al., "Mobility: A VPN Perspective," The 2002 45th Midwest Symposium on Circuits and Systems Conferences Proceedings, Aug. 4-7, 2002, vol. 3, 4, pp. 111-89-111-92.
Bosch et al., "Access network macro-mobility using MP-BGP and IP/MPLS," Juniper Networks, Inc., Aug. 2012, 12 pp.
Bryant et al., "A Framework for Loop-free Convergence," Network Working Group, Internet Draft, Mar. 2006, 23 pp.
Dierks et al., "The Transport Layer Security (TLS) Protocol Version 1.2," Network Working Group, RFC 5246, Aug. 2008, 105 pp.
Eronen, "IKEv2 Mobility and Multihoming Protocol (MOBIKE)," Network Working Group, RFC 4555, Jun. 2006, 31 pp.
Francois et al., "Loop-free convergence using oFIB," Network Working Group, Internet Draft, Oct. 20, 2006, 15 pp.
Kaufman, "Internet Key Exchange (IKEv2) Protocol," Network Working Group, RFC 4306, Dec. 2005, 93 pp.
Kent, "IP Encapsulating Security Payload (ESP)," Network Working Group, RFC 4303, Dec. 2005, 42 pp.
Perkins, "IP Mobility Support for IPv4," Network Working Group, RFC 3344, Aug. 2002, 93 pp.
Rosen et al., "BGP/MPLS IP Virtual Private Networks (VPNs)," Network Working Group, RFC 4364, Feb. 2006, 18 pp.
Semeria, "RFC 2547bis: BGP/MPLS VPN Fundamentals," White Paper, Juniper Networks, Inc., 2001, 38 pp. (Note: Applicant points out in accordance with MPEP 609.04(a) that the 2001 year of publication is sufficiently earlier than the effective U.S. filed and any foreign priority date of Jun. 28, 2012 so that the particular month of publication is not in issue.).
Prosecution History from U.S. Appl. No. 13/536,740, dated Mar. 11, 2014 through Jul. 18, 2014, 73 pp.
Notice of Allowance from U.S. Appl. No. 14/543,754, dated Oct. 16, 2015, 12 pp.

* cited by examiner

MOBILE NODE HOST ROUTE INSTALLATION AND WITHDRAWAL

PRIORITY CLAIM

This application is a continuation of U.S. patent application Ser. No. 14/543,754, filed Nov. 17, 2014, which is a continuation of U.S. patent application Ser. No. 13/536,740, filed Jun. 28, 2012, now U.S. Pat. No. 8,891,450, which claims the benefit of U.S. Provisional Application No. 61/595,587, filed Feb. 6, 2012, and of U.S. Provisional Application No. 61/598,585, filed Feb. 14, 2012, the entire content of each of which being incorporated herein by reference.

TECHNICAL FIELD

The invention relates to mobile networks and, more specifically, to roaming among access networks of service provider networks.

BACKGROUND

A cellular radio access network is a collection of cells that each includes at least one base station capable of transmitting and relaying signals to subscribers' mobile nodes. A "cell" generally denotes a distinct area of a mobile network that utilizes a particular frequency or range of frequencies for transmission of data. A typical base station is a tower to which are affixed a number of antennas that transmit and receive the data over the particular frequency. Mobile nodes, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from mobile nodes into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or mobile network, includes a core packet-switched network, a transport network, and one or more radio access networks (RANs). The core packet-switched network for the mobile network establishes logical connections, known as bearers, among the many service nodes on a path between a mobile node, attached to one of the radio access networks, and a packet data network (PDN). The service nodes then utilize the bearers to transport subscriber traffic exchanged between the mobile node and the PDN, which may include, for example, the Internet, an enterprise intranet, a layer 3 VPN, and a service provider's private network. Various PDNs provide a variety of packet-based data services to mobile nodes to enable the mobile nodes to exchange service data with application or other servers of the PDNs.

Some mobile nodes, in addition to supporting connections to a mobile network via a RAN, also support wireless local area network (WLAN) access network connections that provide connectivity to a broadband network via a WiFi "hotspot" or other wireless access point (WAP). These mobile nodes may support WLAN offload while dual-connected to a RAN of a mobile service provider network as well as to a WLAN access network that is not connected to the mobile service provider core packet-switched network. That is, such mobile nodes may route specific IP flows via the WLAN access network rather than via the RAN in order to avoid traversing the mobile service provider network. However, in such cases, a mobile node uses the local IP address allocated by the WLAN for such IP flows, and neither the WLAN nor mobile service provider network provides IP address preservation to the mobile node to allow "seamless" WLAN offload for IP flows to permit uninterrupted operation of higher-level protocols. While overlay networks that tunnel IP flows between a WLAN and a mobile service provider network or between multiple mobile service provider networks may provide inter-network connectivity, such overlay networks prevent the service providers from enforcing traffic policies. In addition, overlay networks require that the roaming mobile node participate in establishing a tunnel to connect itself to an anchor point of the mobile service provider network for the mobile node.

SUMMARY

In general, techniques are described for atomically installing and withdrawing host routes along paths connecting network routers to attenuate packet loss for mobile nodes migrating among WLAN access networks and a mobile network. The techniques may be applicable in the context of a Mobile virtual provider network (VPN) that extends a virtual routing area of a service provider network that includes a cellular access network to one or more WLAN access networks to provide network data service continuity for roaming mobile nodes. In this context, a Mobile VPN maintains an Internet Protocol (IP) VPN to whichever access network a mobile node uses to connect to the Internet and to distribute host routes in the Mobile VPN to enable the mobile node to keep its IP address while transitioning between networks, where a host route refers to a network route that is specific to a particular mobile node and uniquely identifies the network path to the mobile node within the Mobile VPN.

In some examples, whenever the mobile node moves from one attachment point to the next, it triggers the distribution of its host route from the new attachment point toward the service provider network hub provider edge router ("hub PE router") that anchors the mobile node on a service provider network that provides access to packet-based services via a regional cellular access network. Routers participating in the Mobile VPN install the host route "atomically" from the attachment point to the mobile gateway so as to ensure convergence of the network forwarding plane with the host route toward the new attachment point prior to transitioning mobile node connectivity from a previous attachment point, which may include another WLAN access network, a visited service provider network, or the service provider network. Routers along the upstream propagation path cooperate to delay, if necessary, programming the forwarding plane components of the hub PE router until the remaining routers on the path have programmed their respective forwarding plane components to converge the forwarding plane along the downstream network path from the hub PE router toward the new attachment point of the mobile node. As convergence toward the mobile node is assured, the hub PE router transitions connectivity for the mobile node to the new attachment point by programming its forwarding plane components with the host route. Thereafter, the hub PE router forwards downstream network traffic destined for the mobile node along the downstream network path toward the new attachment point.

In some examples, whenever a mobile node detaches from a roaming attachment point (e.g., a WLAN access network or a visited service provider network) and reattaches by the cellular access network, it triggers withdrawal of a host route for the mobile node by network routers along the network path toward the roaming attachment point. Routers participating in the Mobile VPN withdraw the host route "atomically," with the hub PE router withdrawing the host route prior to any of the downstream network routers along the network path toward the roaming attachment point withdrawing the host route. As a result, the hub PE router atomically switches over the forwarding path to begin forwarding downstream traffic to the mobile node by the service provider network, and downstream traffic may therefore be unaffected by transitional forwarding plane configurations within forwarding plane components of the downstream network routers.

The techniques of this disclosure may provide one or more advantages. For example, a Mobile VPN may cause significant churning in the forwarding plane configurations of participating routers due to mobile node transitions and concomitant host route programming and withdrawal in both the hub PE router and downstream routers. By providing for atomic host route installation and withdrawal, application of the described techniques by participating routers may in many instances avoid routing loops within the network and attendant packet loss that might otherwise occur in corresponding non-atomic host route-related operations. The techniques may consequently contribute to seamless extension of a Mobile VPN for implementing flexible roaming support among heterogeneous networks, including both cellular and WLAN access networks.

In one aspect, a method includes allocating an Internet Protocol (IP) address to a wireless device with a service provider network for accessing services by a cellular access network of the service provider network, wherein the service provider network includes a mobile virtual private network (VPN) that defines routes that are distinct and separate from a default routing space of the service provider network. The method also includes, when the wireless device attaches to a wireless alternate access network other than the cellular access network, dynamically extending the mobile VPN from the service provider network toward the access network by atomically installing a host route for the IP address into a VPN routing and forwarding (VRF) instance associated with the mobile VPN within a downstream router and within an upstream router to enable the wireless device to exchange network traffic via the alternate access network with the service provider network using the IP address allocated by the service provider network, wherein atomically installing the route comprises delaying the upstream router from installing the host route until the downstream router has installed the host route, and wherein, subsequent to atomically installing the route, network traffic destined for the wireless device proceeds from the upstream router toward the downstream router.

In another aspect, a method includes receiving notification, with a router coupled to an access network, that a wireless device is no longer attached to the access network. The method also includes setting a timer with a withdraw wait interval. The method further includes, when the timer expires without the router having received a reverse order route withdraw message for a host route to the wireless device, removing the host route from the router and sending a host route withdraw message to an upstream router that is on a path to the access network from a mobile virtual private network (VPN) to withdraw the host route from the upstream router. The method also includes, upon the router receiving the reverse order route withdrawn message for the host route to the wireless device prior to the timer expiring, removing the host route from the router and not sending the host route withdraw message to the upstream router.

In another aspect, a system includes a service provider network that includes a mobile virtual private network (VPN) that defines routes that are distinct and separate from a default routing space of the service provider network, wherein the service provider network allocates an Internet Protocol (IP) address to a wireless device with a service provider network for accessing services by a cellular access network of the service provider network. The system also includes a wireless alternate access network other than the cellular access network, an upstream router of the mobile VPN, a downstream router of the mobile VPN, and a wireless device that attaches to a wireless alternate access network. The upstream router and the downstream router dynamically extend the mobile VPN from the service provider network toward the access network by atomically installing a host route for the IP address into a VPN routing and forwarding (VRF) instance associated with the mobile VPN within the downstream router and within the upstream router to enable the wireless device to exchange network traffic via the alternate access network with the service provider network using the IP address allocated by the service provider network. The upstream router and the downstream router atomically install the route by delaying the upstream router from installing the host route until the downstream router has installed the host route. Subsequent to atomically installing the route, network traffic destined for the wireless device proceeds from the upstream router toward the downstream router.

In another aspect, a router coupled to an access network includes a routing protocol module, executing on control unit, that receives notification that a wireless device is no longer attached to the access network, wherein the routing protocol module sets a timer with a withdraw wait interval. When the timer expires without the router having received a reverse order route withdrawn message for a host route to the wireless device, the routing protocol module removes the host route from the router and sends a host route withdraw message to an upstream router that is on a path to the access network from a mobile virtual private network (VPN) to withdraw the host route from the upstream router. The routing protocol module, upon the router receiving the reverse order route withdraw message for the host route to the wireless device prior to the timer expiring, removes the host route from the router and does not send the host route withdraw message to the upstream router.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
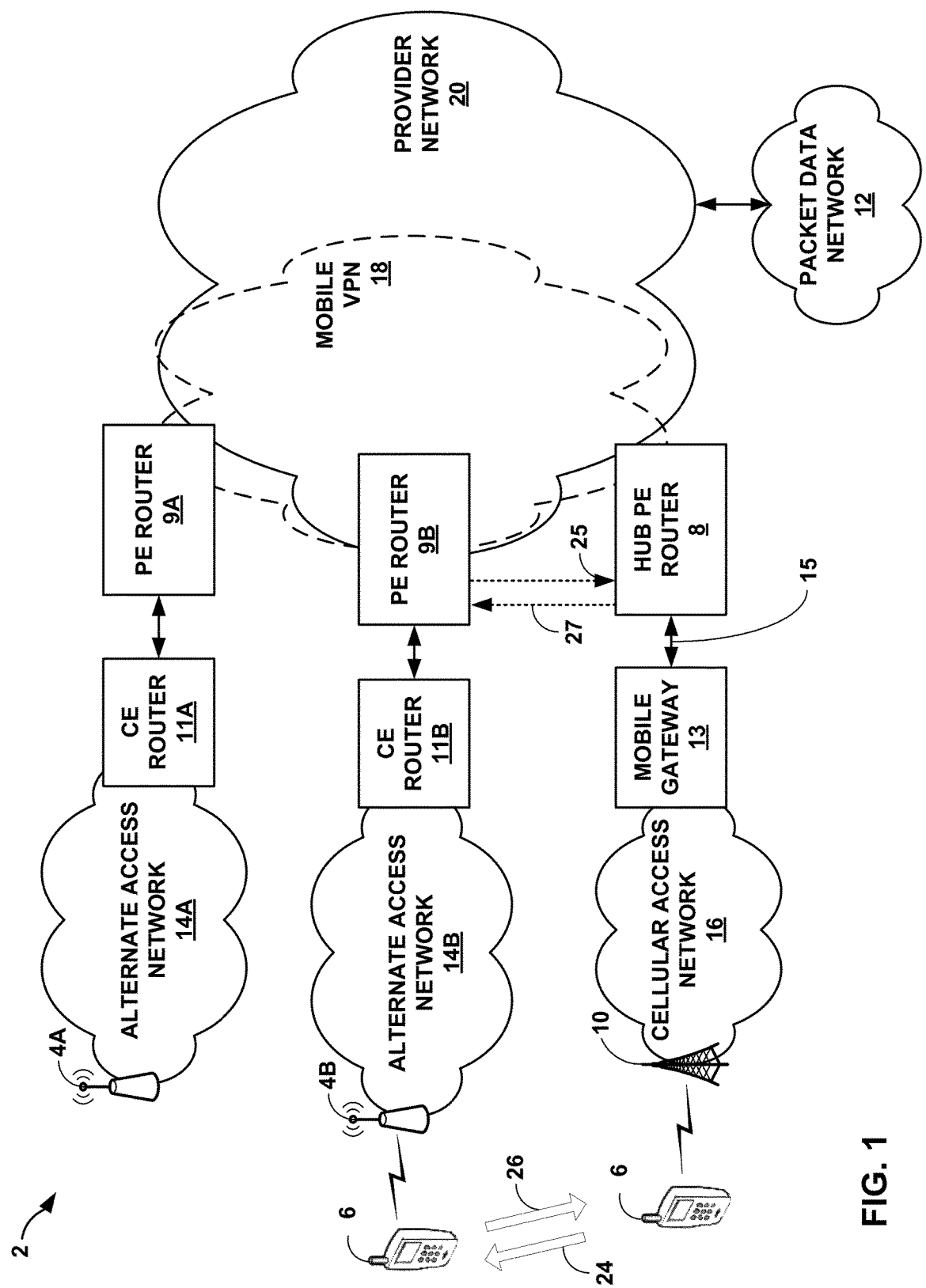
FIG. 1 is a block diagram illustrating an example network system that includes network components that atomically install and withdraw host routes according to the described techniques.

FIG. 1 is a block diagram illustrating an example network system 2 that includes network components that atomically install and withdraw host routes according to the described techniques. In this example, network system 2 comprises packet data network (PDN) 12 coupled to provider network 20 to provide services to customers of the provider network 20 provider. In this way, PDN 12 represents network devices and infrastructure that provide a "service plane" of provider network 20. Packet data network 12 supports one or more packet-based services that are available for request and use by wireless device 6. As examples, PDN 12 may provide, for example, Internet access, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates provider network 20, an enterprise IP network, or some combination thereof. Packet data network 12 executes one or more packet data protocols (PDPs), such as IP (IPv4 and/or IPv6), X.25 or Point-to-Point Protocol (PPP), to enable packet-based transport of PDN 12 services. Provider network 20 may represent a service provider (SP) network.

Wireless device 6 is a mobile node and represents any mobile communication device that supports both cellular radio access and wireless local area network (WLAN) access, e.g., by way of any of the IEEE 802.11 communication protocols (including so called "WiFi" communication protocols). Wireless device 6 may comprise, for example, a mobile telephone, a laptop or other mobile computer having, e.g., a 3G/4G wireless card, a smart phone, or a personal data assistant (PDA). Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as User Equipment (UE) or Mobile Stations (MS). One example of a wireless device utilizing services is described in U.S. patent application Ser. No. 12/967,977 filed Dec. 14, 2010, entitled "MULTI-SERVICE VPN NETWORK CLIENT FOR MOBILE DEVICE," incorporated herein by reference.

A service provider provisions and operates cellular access network 16 including, in some instances, mobile gateway 13 to provide network access, data transport and other services to wireless device 6. In general, cellular access network 16 and mobile gateway 13 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GGP/2), the Internet Engineering Task Force (IETF), and the Worldwide Interoperability for Microwave Access (WiMAX) forum. For example, cellular access network 16 and mobile gateway 13 may together represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Cellular access network 16 and mobile gateway 13 may, alternatively or in conjunction with one of the above, implement a code division multiple access-2000 ("CDMA2000") architecture. Cellular access network 16 and mobile gateway 13 may, again as an alternative or in conjunction with one or more of the above, implement a WiMAX architecture defined by the WiMAX forum. The service provider that operates provider network 20 may be different than a provider/operator of cellular access network 16 and mobile gateway 13. That is, the relationship between the provider network 20 service provider and the cellular access network 16 service provider may be that of a provider and customer, respectively. The customer may be an Internet Service Provider (ISP), an application service provider, or another virtual private network (VPN) service provider. Alternatively, the same service provider may operate both provider network 20 and cellular access network 16.

Cellular access network 16 may include a core packet-switched network and one or more radio access networks (also not shown in FIG. 1) that includes one or more base stations 10 to provide regional cellular access. A core packet-switched network of cellular access network 16 may comprise, for example, a General Packet Radio Service (GPRS) core packed-switched network, or an Evolved Packet Core (EPC) or Evolved Packet System (EPS). The core packet-switched network of cellular access network 16 comprises intermediate devices required to implement the protocols of the particular architectural embodiment of cellular access network 16, such as Serving GPRS Serving Nodes (SGSNs) and Mobility Management Entities (MMEs). Wireless device 6 communicates with cellular access network 16 using a wireless communication link to base station 10 of cellular access network 16. Radio access networks of cellular access network 16 may include, for example, for example, a GSM Radio Access Network (GRAN), a WiMAX radio access network, a UMTS Radio Access Network (UTRAN), and/or an evolution of a UTRAN known as an E-UTRAN. Accordingly, base station 10 may represent a Node B or ENode B, for instance. Cellular access network 16 may further make use of a backhaul or transport network (not shown) that includes land-based transmission lines, frequently leased by the service provider, to transport user and control traffic between wireless device 6 and mobile gateway 13. The backhaul network also includes network devices such as aggregation devices and routers.

Mobile gateway 13 is a customer edge (CE) network device that operates as a gateway and provides an interface to PDN 12 via provider network 20. Mobile gateway 13 may represent an endpoint for reference point SGi (LTE), Gi (3GPP), and Wi(non-3GPP) as described in 3GPP TS 23.402, "Architecture Enhancements for non-3GPP Accesses," Release 10, 3rd Generation Partnership Project, Technical Specification Group Services and System Aspects, June 2011, the entire content thereof being incorporated by reference herein.

Mobile gateway 13 may represent, for example, a Gateway GPRS Serving Node (GGSN), an Access Gateway (aGW), or a Packet Gateway (P-GW). Alternatively, mobile gateway 13 may represent a network element that exchanges traffic between a wireless network deployment represented by cellular access network 16 and provider network 20. For example, mobile gateway 13 may represent may represent an interworking WLAN (I-WLAN) network element, a P-GW, a Packet Data Gateway (PDG) or enhanced PDG (ePDG), or a WLAN Access Gateway (WAG). In some embodiments, mobile gateway 13 may include functionality for a provider edge (PE) router of provider network 20, thus incorporating aspect of hub PE router 8 functionality. Additional information regarding wireless access networks may be found in 3GPP TS 23.234, "3GPP System to Wireless Local Area Network (WLAN) Internetworking," Release 10, 3rd Generation Partnership Project, Technical Specification Group Services and System Aspects, March 2011, the entire content thereof being incorporated by reference herein. While described herein with respect to one or more particular architectures for ease of illustration purposes, cellular access network 16 and mobile gateway 13 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Mobile gateway 13 and elements of cellular access network 16 may, therefore, each represent an abstraction of devices found within any type of mobile network architectures.

Cellular access network 16 and mobile gateway 13 establish and operate an access channel for wireless device 6 to access the service-plane of provider network 20 (represented in FIG. 1 by PDN 12). The access channel may represent, in accordance with different mobile access technologies, a packet data protocol (PDP) bearer or other bearer corresponding to a 3GPP or LTE architecture, a WiMAX channel, a CDMA2000 channel, or another non-3GPP access channel such as a WLAN link. To attach to cellular access network 16, wireless device 6 initiates an attach request toward base station 10. The attach request may include a wireless identifier in the form of a device or subscriber identifier. The wireless identifier may include, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a Globally Unique Temporary Identity (GUTI), a subscriber username, an MSISDN number (e.g., a "Mobile Subscriber Integrated Services Digital Network Number"), an access point name (APN), a service provider identifier, Network Access Identifier, or other data or combination of the above-specified identifiers identifying a subscriber using wireless device 6. In one example, the wireless identifier is of the form username@mobilevpn.apn.homeprovider, where username identifies a particular subscriber seeking access to the service identified by apn and provided by the service provider for provider network 20, which is identified by homeprovider.

Cellular access network 16 passes the wireless identifier or a subset of the data included therein to mobile gateway 13, which associates the access channel provisioned for wireless device 6 with an interface to PDN 12 via provider network 20. Mobile gateway 13 may authenticate wireless device 6 to provider network 20 using the wireless identifier received from wireless device 6. In addition, mobile gateway 13 allocates, or relays from provider network 20, an IP address for wireless device 6 to use in exchanging IP packet belonging to IP traffic flows with PDN 12. Wireless device 6 uses the access channel and its allocated IP address to engage PDN 12 services.

Provider network 20 supports mobile virtual private network (VPN) 18 with which customer edge (CE) devices, in this case represented by mobile gateway 13 and CE routers 11A-11B (collectively, "CE routers 11"), served by provider network 20 may exchange routes with other CE devices also served by provider network 20. In one example, mobile VPN 18 is an IP-based VPN established and served by provider network 20 such that mobile VPN 18 routes are distinct and separate from the default routing space of provider network 20 as well as any other VPNs supported by the provider network. One example of an IP-based VPN is described more fully in Rosen and Rekhter, "BGP/MPLS IP Virtual Private Networks (VPNs)", Request for Comments 4364, Network Working Group, February 2006, the entire contents of which being incorporated by reference herein. Additional details regarding Mobile VPNs are found in U.S. patent application Ser. No. 13/332,163, "VIRTUAL PRIVATE NETWORKING WITH MOBILE COMMUNICATION CONTINUITY," filed Dec. 20, 2011, the entire content of which is incorporated as if fully set forth herein.

Provider network 20 uses route distribution protocols, such as Multi-Protocol Border Gateway Protocol (MP-BGP), to distribute routes specific to mobile VPN 18 that are advertised by edge routers of mobile VPN 18, including PE routers 9A-9B (collectively, "PE routers 9") and hub PE router 8, to one another. In this example, provider network 20 assigns each route within mobile VPN 18 a Multiprotocol Label Switching (MPLS) label. Accordingly, edge routers of the mobile VPN 18 may distribute an MPLS label with any advertised route.

In the illustrated example, an administrator configures mobile VPN 18 in a hub-and-spoke topology by configuring asymmetrical route target import and export lists in routers of mobile VPN 18. For example, the hub and each spoke may be configured to import a different route target. When an edge router of provider network 20 receives an advertised route, the edge router compares the attached route target to its route target import list and imports routes having matching attached route targets to the virtual routing and forwarding (VRF) instance associated with mobile VPN 18. In addition, mobile VPN 18 routes may carry a route distinguisher that ensure the address space for mobile VPN 18 remains distinct and separate from the default address space and the address space for any other VPN in which any of the edge routers of provider network 20 participate. For example, PE router 9A may include a route distinguisher associated identifying mobile VPN 18 in MP-BGP route advertisements of mobile VPN 18 routes.

In accordance with the hub-and-spoke topology, the spoke sites (represented in FIG. 1 by alternate access networks 14A-14B) in mobile VPN 18 can communicate only with the hub site (represented by cellular access network 16); they cannot communicate with one another. A "site" refers to a network connected to mobile VPN 18 (and thus to provider network 20) by an attachment circuit to one of PE routers 9 or hub PE router 8 of provider network 20. For example, CE router 11B of alternate access network 14B connects to PE router 9B of mobile VPN 18 by an attachment circuit. In this respect, PE routers 9 may be considered "spoke" PE routers, and "spokes" thus radiate from hub PE router 8 through to respective spoke PE routers 9 toward respective CE routers 11. As another example, mobile gateway 13 connects to hub PE router 8 by attachment circuit 15. An attachment circuit may include, for example, a point-to-point protocol (PPP) connection, Asynchronous Transfer Mode (ATM) Virtual Circuit (VC), Frame Relay VC, Ethernet interface, Virtual Local Area Networks (VLAN) on an Ethernet interface, Generic Route Encapsulation (GRE) tunnel, Layer 2 Tunneling Protocol (L2TP) tunnel, or IPSec tunnel. In some instances, a single device integrates mobile gateway 13 functionality for cellular access network 16 with hub PE router 8 functionality for provider network 20. Such a device may be referred to herein as an IP mobile gateway (IP-MGW).

When forwarding packets sourced by customer devices of mobile VPN 18, including wireless device 6, a PE router supporting mobile VPN 18 encapsulates the packets with the MPLS label that corresponds, in mobile VPN 18, to the route that is the best match to the destination address for the packet. This MPLS packet is further encapsulated (e.g., with another MPLS label and/or with an IP header) so that it gets tunneled across the provider network 20 backbone to the proper edge router supporting mobile VPN 18. Thus, core routers of provider network 20 do not need to know the VPN routes of mobile VPN 18, and the routes of mobile VPN 18 may remain distinct and separate from the default address space and the address spaces of other VPNs served by provider network 20. As mobile gateway 13 provides an interface to provider network 20 and, by extension, to mobile VPN 18 established by provider network 20, mobile gateway 13 may alternately be referred to as a "home mobile gateway."

Alternate access networks 14A-14B (collectively, "alternate access networks 14") connect to spokes of mobile VPN 18. Each of alternate access networks 14 represents a non-cellular wireless access network such as a local area network (WLAN), WiMAX, or Femtocell network, for example, and includes access points, intermediate authentication, authorization, and accounting (AAA) elements and, in the illustrated examples, a respective one of CE routers 11. In these embodiments, access points 4A-4B provide local radio communication to wireless devices, e.g., by way of any of the IEEE 802.11 communication protocols, and thus operates as a WiFi or WiMAX "hotspot," Femtocell, or other wireless access point that serves as a bridge to the wired network infrastructure represented by alternate access networks 14. Alternate access networks 14 provide access channels between wireless devices and respective spoke PE routers 9. Each of alternate access networks 14 may be provisioned by a service provider of provider network 20 or another service provider.

In some instances, any of alternate access networks 14 may couple to a service provider network other than provider network 20 that then transports data traffic between the CE router 11 of the alternate access network 14 and an autonomous system border router (ASBR) of provider network 20. This other service provider network may be alternatively referred to as a visited service provider network for wireless device 6 when wireless device 6 attaches to any of alternate access networks 14 coupled to the visited service provider network. In some examples, any of alternate access networks 14 may represent a cellular access network of a visited service provider.

Subsequent to being provisioned with an IP address, wireless device 6 performs migration 24 and attaches to alternate access network 14B via access point 4B to receive network services by mobile VPN 18. Access point 4B may serve a particular location, such as a service provider or third-party hotspot, i.e., a commercial establishment that provides a wireless access point with which customers may establish a wireless access channel to access network services (e.g., Internet access). The location may also include a residency having a wireless access point, such as a wireless router, deployed to facilitate access to network services.

To ensure delivery of downstream network traffic destined for wireless device 6 to alternate access network 14B, CE router 11B upon attachment by wireless device 6 advertises a host route for wireless device 6 to PE router 9B. A host route uniquely identifies wireless device 6 within mobile VPN 18. The host route may include a /32 route (i.e., a route prefix with length 32) where mobile VPN 18 is an IPv4 network, where the route prefix is an IP address allocated to wireless device 6 for connectivity via cellular access network 16. Where mobile VPN 18 is an IPv6 network, the route prefix may include a /128 route, where the route prefix is an IP address allocated to wireless device 6 for connectivity via cellular access network 16. The host route may be advertised together with a route distinguisher identifying mobile VPN 18.

Because of the hub-and-spoke configuration, hub PE router 8 is a next hop for downstream traffic for wireless devices, (including wireless device 6) that receive network services by cellular access network 16, irrespective of whether the wireless device is attached to cellular access network 16 or to any of alternate access networks 14. In accordance with the techniques of this disclosure, routers participating in the mobile VPN 18 advertise the host route for wireless device 6 upstream (i.e., toward hub PE router 8) together with timing information so as to ensure convergence of the network forwarding plane with the host route toward CE device 11B prior to transitioning connectivity from the previous attachment point with cellular access network 16 to the new attachment point with one of alternate access networks 14.

In the illustrated example, PE router 9B advertises a host route for wireless device 6, upon attachment of the wireless device to alternate access network 14B, to hub PE router 8 using host route advertisement 25, which conforms to a routing protocol advertisement of a route distribution protocol (e.g., Multi-Protocol Border Gateway Protocol (MP-BGP)) that is modified to facilitate atomic host route installation techniques. Host route advertisement 25 includes timing information that directs hub PE router 8 to delay installing a host route for wireless device 6 toward PE router 9B. In addition, the term "host route advertisement," refers to an advertisement associated with a mobile VPN, such as mobile VPN 18.

In some instances, the timing information includes an absolute or global time that causes hub PE router 8 to postpone installing the included host route until the time passes. The absolute time may be defined according to a clock synchronized among at least the edge routers of mobile VPN 18. For example, the edge routers of mobile VPN 18 may synchronize to Global Position System (GPS) timing signals that determine an expiry of the absolute time included in host route advertisement 25. The absolute time may be expressed in host route advertisement 25 according to any of a number of temporal expressions, such as "ddMONyyyy:hh:mm:ss:[ms]," where dd refers to a calendar day of the month MON (e.g., JUL (July)) in the year yyyy, and hh, mm, ss, and ms refer to the hour, minute, second, and zero-padded millisecond of the absolute time. Alternatively, the absolute time may include ss:[ms], i.e., include only seconds and milliseconds. Absolute time may be expressed according to any of a number of different time granularities, including milliseconds, seconds, ticks, and so forth.

In some instances, the timing information includes a delay time interval that causes hub PE router 8 to delay, from the time of host router advertisement 25 receipt, installing the included host route until a time equal to the delay time interval expires. Like the absolute time described above, the delay time interval may be expressed according to any of a number of temporal expression. The delay time interval may include an integer that defines a number of clock ticks, milliseconds, hundreds of microseconds, and so forth. In the above-described examples, hub PE router 8 "implements" or "installs" a host route included in host route advertisement 25 by forwarding traffic directed to the host route prefix according to the host route forwarding information (e.g., a next hop included therein).

PE routers 9 generate timing information for host route advertisements to account for parallel processing of the host route by PE routers 9 themselves. For example, for host route advertisement 25, PE router 9B anticipates its own (non-zero) processing time for installing the host route and incorporates this processing time into the timing information. For example, as described in further detail below, PE router 9B may measure the time required to program forwarding components of PE router 9B with the host route. PE router 9B may then include a representation of this required time in host route advertisement 25. For example, if PE router 9B measures the time required to program forwarding components as 10 ms, PE router 9B may generate timing information for host route advertisement 25 to delay hub router 8 by 10 ms. In instances that use an absolute time, PE router 9B combines the delay time (10 ms) with a current time and includes the combined time in host route advertisement 25. In instances that use a delay time interval, PE router 9B includes a representation of the delay time of 10 ms in host route advertisement 25.

In some topologies, one or more spokes of the hub-and-spoke topology of mobile VPN 18 may include multiple routers. For example, mobile VPN 18 may include a number of different Interior Gateway Protocol (IGP) areas (e.g., Open Shortest Path First areas), with each area potentially having a separate route reflector for BGP. In such topologies, a spoke may include one or more core or provider (P) routers of provider network 20 that operate as border routers of the respective areas. The P routers are intermediate routers that forward traffic between hub PE router 8 and PE routers 9.

The P routers may, in addition to spoke PE routers 9, incorporate timing information for host route advertisement propagation. A P router upstream to PE router 9B, for example, combines timing information with its own (non-zero) processing time for installing the host route and incorporates this processing time into timing information to send to hub PE router 9. In instances that use an absolute time, the P router may include the maximum of its own absolute time for installing the host route and of the absolute time received in a host route advertisement from a downstream router (e.g., PE router 9B). In instances that use a delay interval time, the P router may include the maximum of its own delay time and the delay time interval received in a host route advertisement. Other than hub PE router 9, upstream routers of a spoke may avoid delaying their own processing of an advertised host route due to timing information including in a host route advertisement. For example, a P router may immediately begin processing a host route advertisement to install the host route, so long as hub PE router 9 delays sufficiently such that all of the downstream routers have installed the host route prior to hub PE router 9 installing the host route. To that end, hub PE router 9 receives the timing information and delays installing the advertised host route to align with the processing time of all of the downstream routers of the spoke (on which the corresponding wireless device for the host route is attached to mobile VPN 18). As a result, the downstream routers of the spoke have completed transitioning to installing the host route prior, and the hub PE router 9 delayed installation of the host route is an atomic operation that may prevent routing loops within the spoke that can otherwise occur with conventional route advertisement and processing. Routers of mobile VPN 18 may apply similar techniques in instances where wireless device 6 migrates between alternate access networks 14.

Wireless device 6 performs migration 26 to detach from alternate access network 14B and reattach to cellular access network 16 to continue to receive network services by mobile VPN 18 using a previously assigned IP address. For example, the user of wireless device 6 may leave the location served by access point 4B, thus breaking the WLAN connection. In accordance with techniques described in this disclosure, hub PE router 8 initiates withdrawal of the host route for wireless device 6 in a reverse path toward the previous attachment spoke. That is, hub PE router 8 receives notification that wireless device 6 is now attached by mobile gateway 13 rather than by CE router 11B. Notification may include out-of-band (e.g., not routing protocol-based) signaling or host route advertisement for wireless device 6 from mobile gateway 13 to hub PE router 8, for example.

Hub PE router 8 withdraws the host route for wireless device 6 to redirect downstream network traffic for wireless device 6 toward mobile gateway 13 according to an aggregate prefix for devices attached to cellular access network 16. In addition, subsequent to withdrawing the host route for wireless device 6, hub PE router 8 sends reverse path host route withdraw message 27 to PE router 9B directing PE router 9B to withdraw the host route for wireless device 6 from its routing information base. As a result, hub PE router 8 completes withdrawing the host route for wireless device 6 prior to withdrawal of the host route for wireless device 6 by any of the downstream routers of the spoke with which wireless device 6 had a previous attachment. Atomic route withdrawal according to these techniques, proceeding from the hub toward the spoke, may prevent routing loops that can otherwise occur with conventional route withdrawal that proceeds from the spoke to the hub. Routers of mobile VPN 18 may apply similar techniques in instances where wireless device 6 migrates between alternate access networks 14. In such instances, hub PE router 8 installs a new host route to the new attachment point in addition to initiating withdrawing the host route from the previous attachment point.

Figure 2:
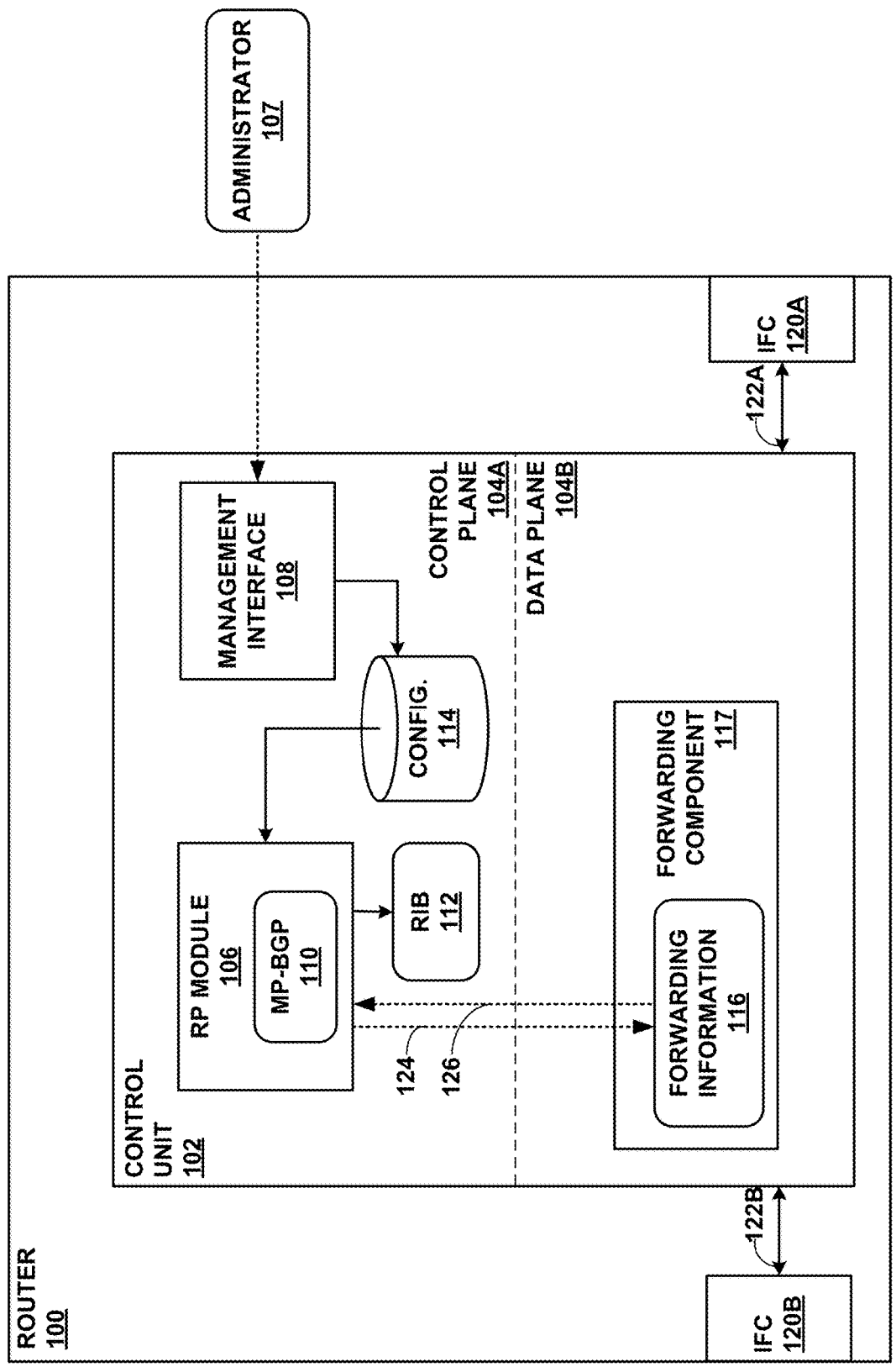
FIG. 2 is a block diagram illustrating an example router that applies techniques described in this disclosure.

FIG. 2 is a block diagram illustrating an example router that applies techniques described in this disclosure. Router 100 may represent any of PE routers 9, hub router 8, CE routers 11, or mobile gateway 8 of FIG. 1, for example. Router 100 may also represent an IP-MGW. Moreover, while described with respect to a particular network device, e.g., a router, the techniques may be implemented by any network device that may operate to perform the functionality herein described. As described in further detail with respect to FIGS. 3-8, components of router 100 apply atomic route installation and withdrawal techniques in accordance with techniques of this disclosure. Router 100 may apply any subset of the techniques. Moreover, the components are illustrative, for router 100 may apply the techniques using any suitable component configuration.

Router 100 includes a control unit 102 and interface cards 120A-120B ("IFCs 120") coupled to control unit 102 via internal links 122A-122B. Control unit 102 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 102 is divided into two logical or physical "planes" to include a first control or routing plane 104A and a second data or forwarding plane 104B. That is, control unit 102 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 104A of control unit 102 executes the routing and signaling functionality of router 100. In this respect, control plane 104A represents hardware or a combination of hardware and software of control unit 102 for executing routing protocol (RP) module 106 that implements routing protocols such as MP-BGP 110 by which routing information may be received, advertised, processed, and stored in routing information base 112 ("RIB 112"). RIB 112 includes information defining a topology of a mobile VPN that is associated with a route target corresponding to a VRF instance. That is, the VRF instance defines participation by router 100 in a mobile VPN established by a provider network in which router 100 operates. Control plane 104A may resolve the topology defined by routing information in RIB 112 to select or determine one or more routes through the mobile VPN. Control plane 104A may then update data plane 104B with these routes, where data plane 104B maintains these routes within forwarding information 116. Control plane 104A may also define a default routing and forwarding instance as well as one or more additional VRF instances (not shown) for routing and forwarding in networks other than the mobile VPN.

Data plane 104B represents hardware or a combination of hardware and software of control unit 102 that provides high-speed forwarding of network traffic received by interface cards 120 in accordance with forwarding information 116. Forwarding component 117 of data plane 104B performs lookups in forwarding information 116 based on packet key information for received packets to determine ingress and egress interfaces and corresponding encapsulations for the packets. Forwarding component 117 may include a packet forwarding engine.

In the illustrated example, forwarding component 117 acknowledges route updates from RP module 106 after installing the route updates. For example, RP module 106 issues route update 124 directing forwarding component 117 to program a route within forwarding information 116. After forwarding component 117 programs the route, forwarding component 117 returns route update acknowledgement 126.

Management interface 108 is a process executing on control plane 104B that provides an interface by which administrator 107, a network operator or network management system for instance, may modify configuration data 114 (illustrated as "config. 114") of router 100. Control unit 102 stores configuration data 100 to a computer-readable storage medium. Management interface 108 may present a shell and/or a graphical user interface (GUI) by which an administrator or other management entity may modify the configuration of router 100 using text-based commands and/or graphical interactions, respectively. In addition, or in the alterative, management interface 108 may present an agent that receives Simple Network Management Protocol (SNMP) or Netconf commands from a management entity to set and retrieve configuration and management information for router 100.

Figure 3A:
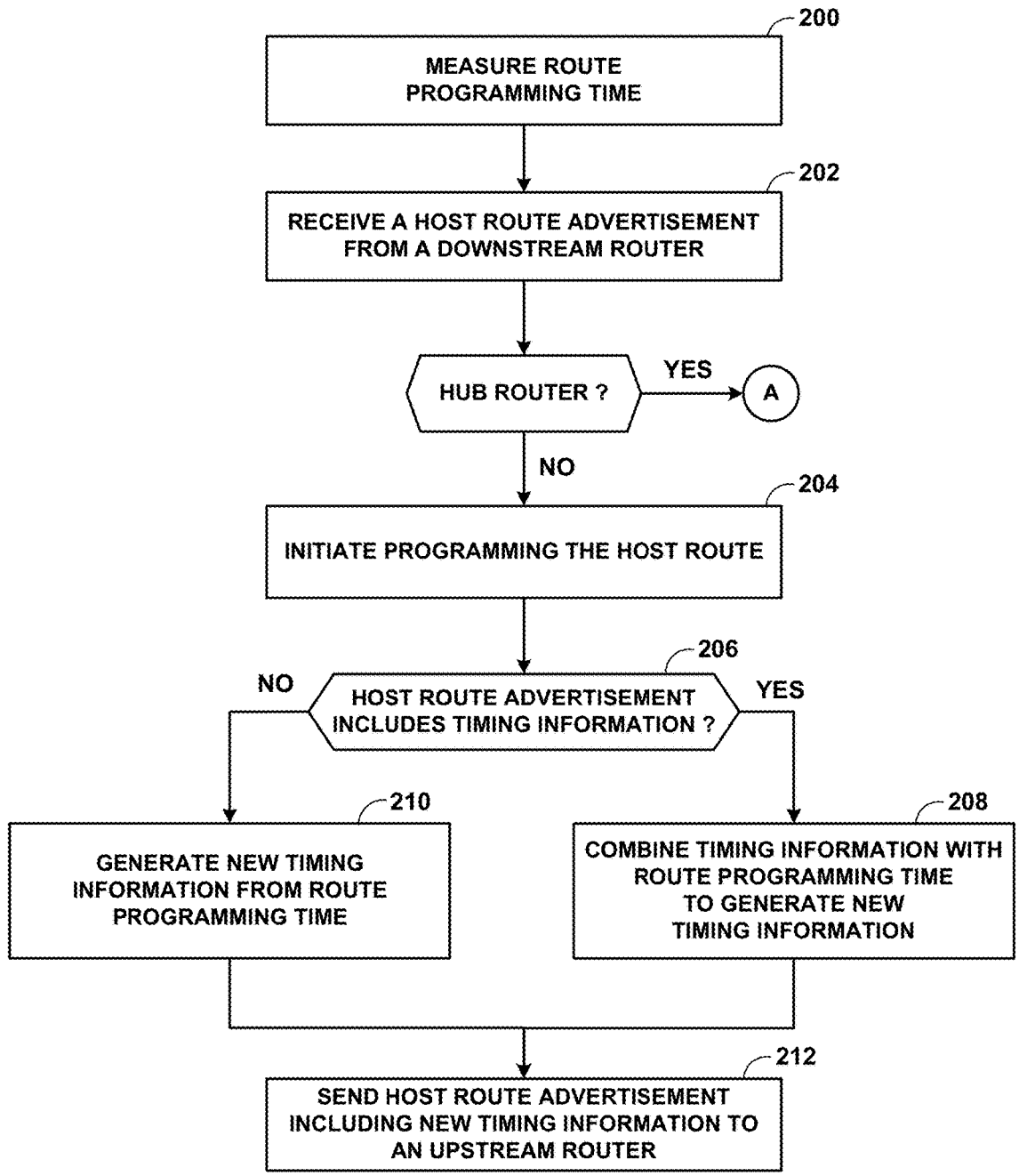
FIGS. 3A-3B depict a flow chart illustrating example operations of routers to atomically install host routes according to techniques described in this disclosure.
Figure 3B:
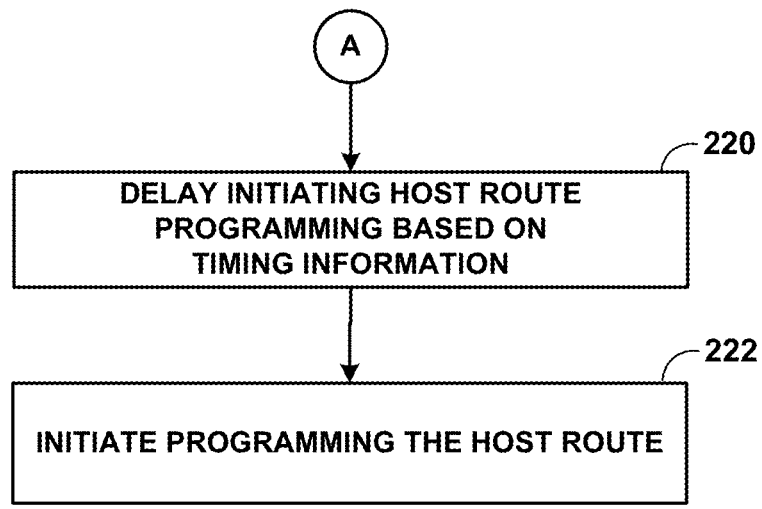

FIGS. 3A-3B depict a flowchart illustrating example operations of routers to atomically install host routes according to techniques described in this disclosure. The operations are described with respect to an instance of router 100 of FIG. 2 operating within a mobile VPN, such as mobile VPN 18 of FIG. 1.

Routing protocol module 106 measures a time required to program forwarding component 117 with new routes in forwarding information 116 (200). For example, RP module 106 may start a timer upon sending route update 124 to forwarding component 117 and read the timer value upon receiving route update acknowledgement 126. The read timer value indicates a time required to program forwarding component 117 and correlates to the time required by router 100 to install a host route. Routing protocol module 106 may generate, based on previously read timer values under various levels of programming load, a function or histogram (for instance) that maps programming load to anticipated route programming time (i.e., the time required to install the route such that the route is operative for forwarding traffic). Routing protocol module 106 may then use this association when generating timing information.

Routing protocol module 106 receives a host route advertisement from a downstream router of a spoke of the hub-and-spoke topology of mobile VPN 18 (202). The host route advertisement may conform to MP-BGP 110. If router 100 is hub PE router 8 (YES branch of 202), RP module 106 delays initiating host route programming based on timing information included in the host route advertisement (220). Once the delay based on the timing information has occurred, RP module 106 sends route update 124 including the advertised host route to program the advertised host route in forwarding information 116 (222). In some instances, RP module 106 delays a difference between the delay based on the timing information and the time required to program forwarding component 117. For example, if $T_d$ represents the delay based on the timing information and $T_p$ represents the programming time, RP module 106 may delay $T_d$-$T_p$ or may avoid delaying programming the host route if $T_d$-$T_p$ is less than zero.

If router 100 is not hub PE router 8 (NO branch of 202), RP module 106 sends route update 124 including the advertised host route to immediately initiate programming the advertised host route (204). For example, RP module 106 may initiate programming the advertised host route by sending route update 124 including the advertised host route to forwarding component 117. If the host route advertisement does not include timing information (NO branch of 206), RP module 106 generates new timing information based on the measured route programming time (210). For example, if the measured route programming time is 10 ms, RP module 106 may generate new timing information directing an upstream hub router to delay programming by 10 ms. Alternatively, RP module 106 may generate new timing information indicate an absolute time at which router 100 installs the advertised host route by summing the current time and the route programming time. If the host route advertisement includes timing information (YES branch of 206), RP module 106 combines the included timing information with the measured route programming time to generate new timing information (208). RP module 106 may determine the maximum delay (i.e., for the slowest router as respects programming the host route) as between the included timing information and the measured route programming time and generate the new timing information based on the maximum delay. For example, if $T_p$ is the route programming time, $T_c$ is the current time, and $T_a$ is an absolute time received in the included timing information, RP module 106 may determine a maximum delay as the maximum of ($T_p$+$T_c$, $T_a$). As another example, if $T_d$ is a delay time interval received in the included timing information, RP module 106 may determine a maximum delay as the maximum of ($T_d$, $T_p$). Routing protocol module 106 encapsulates the generated new timing information in a new host route advertisement that included the received host route and sends the new host route advertisement to an upstream router of the spoke of mobile VPN 18 that includes router 100 (212). Routing protocol module 106 may include a network address of router 100 as a next hop address within the new host route advertisement. In this way, RP module 106 of routers in a spoke of a hub-and-spoke topology of a mobile VPN may implement a decentralized delay by the hub router for implementing a host route.

Figure 4:
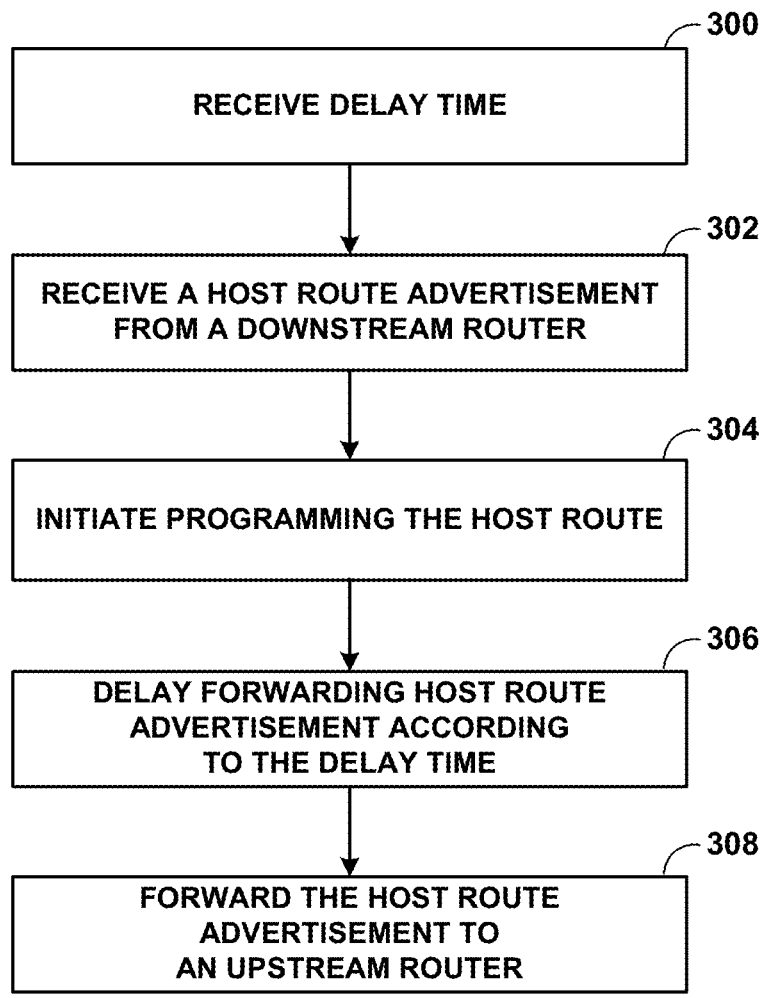
FIG. 4 is a flowchart illustrating an example mode of operation to delay forwarding host route advertisements to upstream routers according to a configured delay time in accordance with techniques described herein.

FIG. 4 is a flowchart illustrating an example mode of operation to delay forwarding host route advertisements to upstream routers according to a configured delay time in accordance with techniques described herein. Initially, management interface 108 receives a delay time in a message from administrator 107 and stores the delay time to configuration data 114 (300). Subsequently, RP module 106 receives a host route advertisement from a downstream router on a spoke of mobile VPN 18 (302). RP module 106 initiates programming the host route included within the host route advertisement to data plane 104B (304). For example, RP module 106 may initiate programming the advertised host route by sending route update 124 including the advertised host route to forwarding component 117.

Rather than immediately forwarding the host route advertising upstream along the spoke, RP module 106 reads the delay time from configuration data 114 and delays accordingly (306). For example, RP module 106 may set a timer to the delay time and wait to forward the host route advertisement upstream until the timer expires. After the delay time passes, RP module 106 forwards the host route advertisement upstream (308). Routing protocol module 106 may include a network address of router 100 as a next hop address within the forwarded host route advertisement. As a result, administrator 107 may prevent routing loops within spokes by setting a delay time for forwarding host routes upstream within RP module 106.

Figure 5:
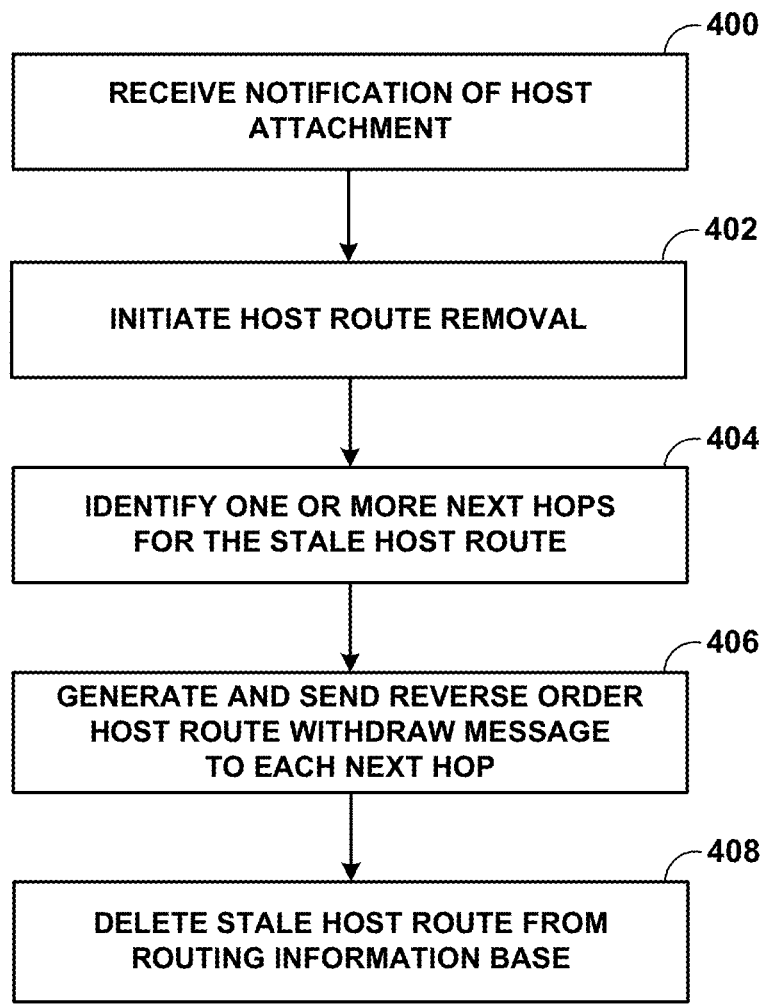
FIG. 5 is a flowchart illustrating an example mode of operation of a router to apply reverse path host route withdrawal in accordance with techniques of this disclosure.

FIG. 5 is a flow chart illustrating an example mode of operation of a router to apply reverse path host route withdrawal in accordance with techniques of this disclosure. For purposes of description, the operation is described with respect to an instance of router 100 of FIG. 2 operating as a hub PE router 8 of FIG. 1. RP module 106 receives a notification that a host wireless device has attached to a new attachment point (400), where the wireless device previously attached to one of alternate access networks 14 and a corresponding host route was installed to forwarding information 116. The new attachment point may be a different one of alternate access networks 14 or cellular access network 16. RP module 106 atomically switches over to forwarding downstream network traffic to the wireless device toward the new attachment point by removing the corresponding host route from forwarding information 116 (402).

Upon removing the host route from data plane 104B, RP module 106 subsequently facilitates graceful withdrawal of the host route among routers along the spoke toward the previous attachment point. RP module 106 queries RIB 112 to identify one or more next hops (multiple next hops may be present for load balancing) to the prefix according to the stale host route (404). RP module 106 then generates and sends, to each next hop, a reverse path route withdraw message that conforms to MP-BGP 110 and includes an attribute indicating that the route withdraw message should be forwarded downstream to next hops of the route being withdrawn (i.e., the stale host route) (406). As a result, routers downstream of hub PE router 8 applying the operation will apply a similar operation to remove the host route from their respective data planes and forward the route withdraw message in a reverse ordering (i.e. toward the spoke). RP module 106 deletes the stale host route from RIB 112 upon sending the one or more reverse path host route withdraw messages to remove the record of the prior attachment from control plane 104A (408). Alternatively, RP module 106 may store a copy of the stale route at step 402 of the illustrated operation and delete the stale host route from RIB 112 in conjunction with removing the host route from data plane 104B.

Figure 6:
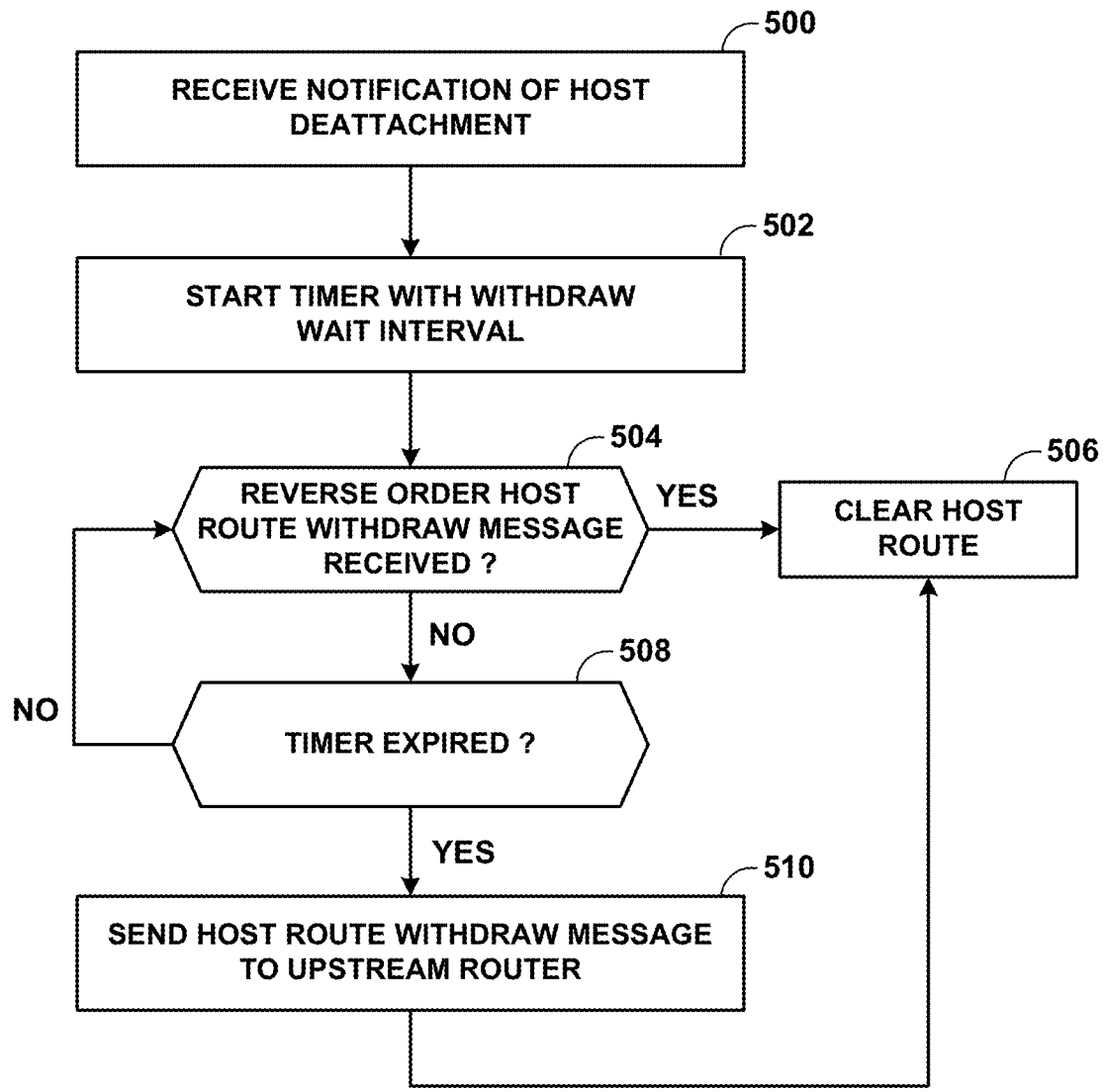
FIG. 6 is a flowchart illustrating an example operation of a router to delay conventional route withdrawal according to techniques of this disclosure.

FIG. 6 is a flowchart illustrating an example operation of a router to delay conventional route withdrawal according to techniques of this disclosure. For purposes of description, the operation is described with respect to an instance of router 100 of FIG. 2 operating as one of CE routers 11 of FIG. 1. RP module 106 receives notification that a host route for a wireless device attached to one of alternate access networks 14 on a spoke of mobile VPN 18 is no longer valid (500). In other words, the wireless device is no longer attached or is otherwise unreachable by the host route, and the host route must be withdrawn. The notification may represent a failed Address Resolution Protocol request or Internet Configuration Management Protocol echo request.

RP module 106 starts a timer to delay withdrawing the host route according to a withdraw wait interval set in configuration data 114 (502). If RP module 106 receives a reverse path host route withdraw message from an upstream router of the spoke within the withdraw wait interval (YES branch of 504), RP module 106 clears the stale host route from RIB 112 and forwarding information 116 (506). If, on the other hand, the timer expires without RP module 106 having received a reverse path host route withdraw message (YES branch of 508), RP module 106 executes a conventional host withdrawal by sending a host route withdraw message to the corresponding one of PE routers 9, that is, an upstream router on the spoke (510) and removing the host route from RIB 112 and forwarding information 116 (506). The host route withdraw message and reverse path host route withdraw message may conform to MP-BGP 110 and the techniques of this disclosure. By delaying the withdraw wait interval, CE routers 11 may allow reverse path host route withdrawal initiated by hub PE router 8 to proceed downstream toward PE routers 9 to further atomicity of the switchover to the new attachment point. In other words, conventional host route withdrawal avoids causing host route withdrawal until the reverse path host route withdrawal has had a chance to run its course or, at the very least, that the stale host route be first withdrawn from hub PE router 8. If the timer expires and no reverse path host route withdraw message is forthcoming, CE routers 11 resume conventional route withdrawal responsibilities.

Figure 7:
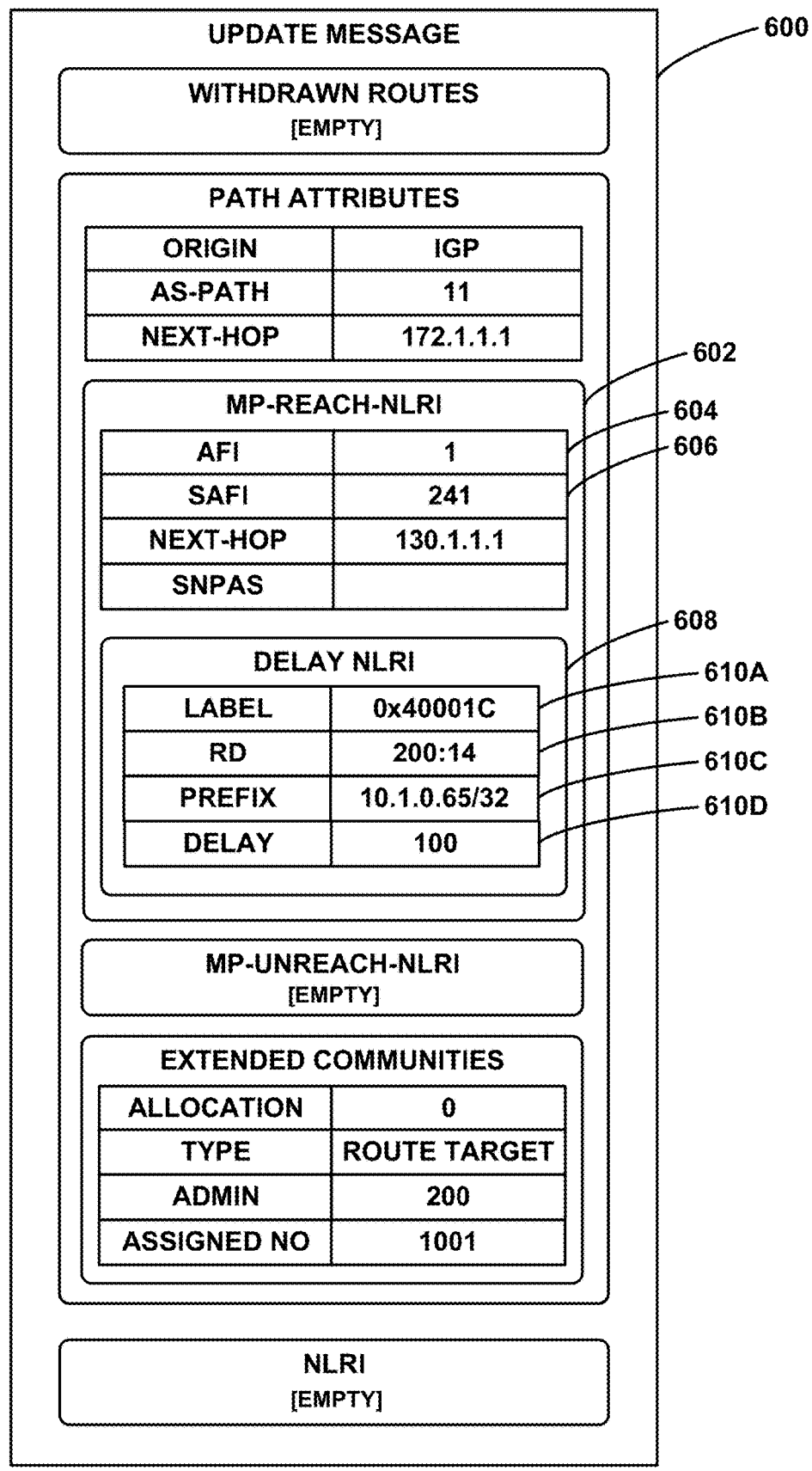
FIG. 7 is a block diagram illustrating an example host route advertisement that includes, in accordance with techniques described herein, timing information to delay route installation by a hub provider edge router.

FIG. 7 is a block diagram illustrating an example host route advertisement that includes, in accordance with techniques described herein, timing information to delay route installation by a hub provider edge router. Extended BGP UPDATE message 600 conforms to MP-BGP and includes MP-REACH-NLRI 602 advertising a host route for a wireless device newly attached to a spoke of a hub-and-spoke mobile VPN topology. Extended BGP UPDATE message 600 may represent an example instance of host route advertisement 25 illustrated in FIG. 1. For purposes of illustration, extended BGP UPDATE message 600 is illustrated using glyphs, rather than with packet fields.

MP-REACH-NLRI 602 of extended BGP UPDATE message 600 specifies an Address Family Identifier (AFI) 604 of 1 in this example to indicate IPv4 network addresses, along with a value for the Subsequent AFI (SAFI) 606 of 241 to identify delay NLRI 608 as carrying timing information. AFI 604 and SAFI 606 may in some instances have different values, as assigned by a private party or by the Internet Assigned Numbers Authority (IANA).

Delay Network Layer Reachability Information (NLRI) 608 specifies a host route for the wireless device having IP address 10.1.0.65, identified in prefix 610C and assigned to facilitate access to network services by a cellular access network. Route distinguisher 610B is associated with a mobile VPN, such as mobile VPN 18 of FIG. 1, and label 610A specifies an MPLS label for an LSP from a hub PE router of the mobile VPN toward a spoke PE router to which the wireless device is attached. A value of delay 610D specifies a delay interval time added by an router of the spoke, advertising extended BGP UPDATE message 600, to direct a hub PE router of the mobile VPN to delay installing the route included in delay NLRI 608. In this example, the delay 610D value of 100 indicates that the hub PE router is to delay installing the route 100 ms. Other example timing information formats and values may be used, as described in further detail above.

Figure 8:
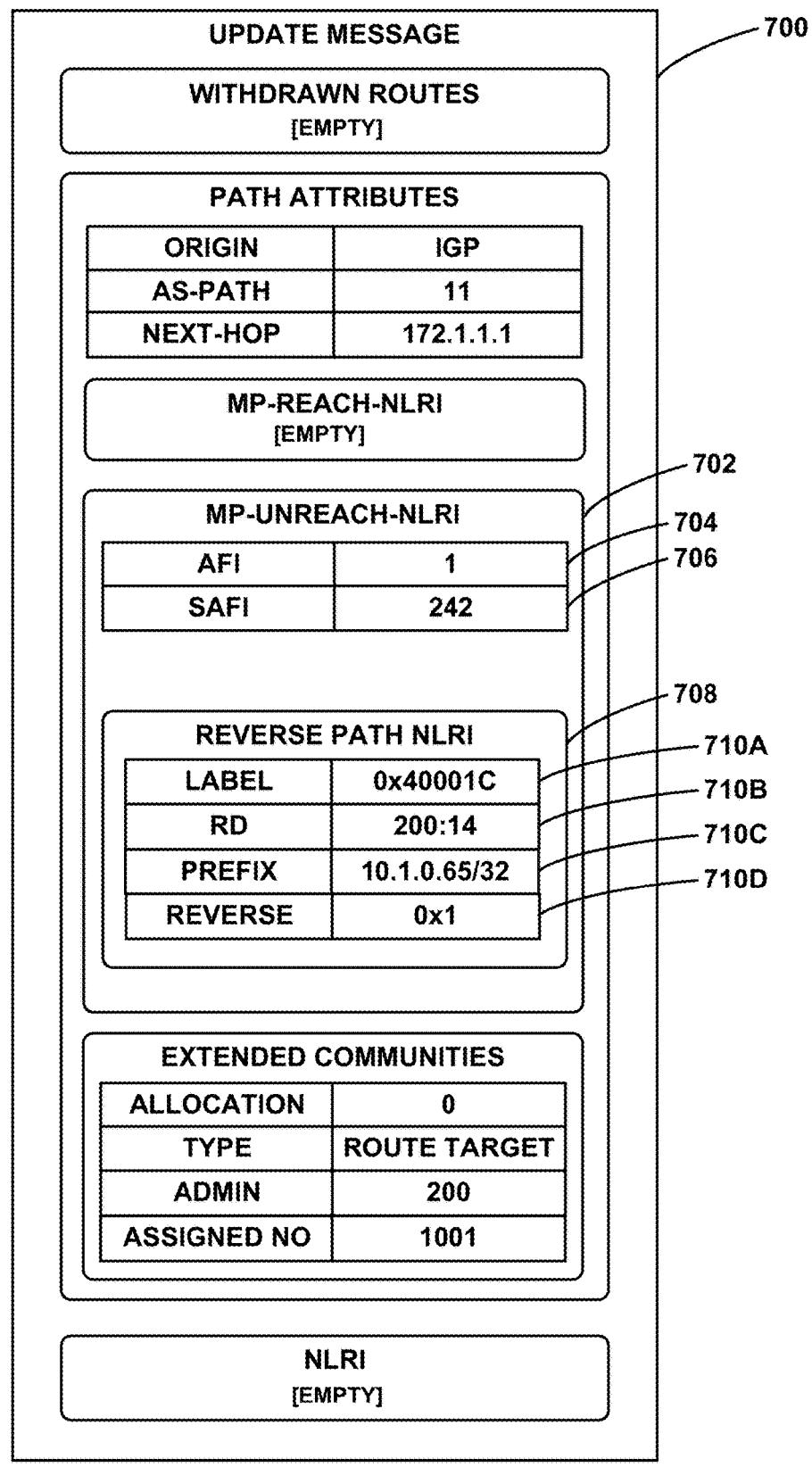
FIG. 8 is a block diagram illustrating an example reverse path host route withdrawal message that includes, in accordance with techniques described herein, a flag directing receiving routers to perform reverse path host route withdrawal.

FIG. 8 is a block diagram illustrating an example reverse path host route withdraw message that includes, in accordance with techniques described herein, a flag directing receiving routers to perform reverse path host route withdrawal. Extended BGP UPDATE message 700 conforms to MP-BGP and includes MP-UNREACH-NLRI 702 advertising a no longer reachable host route for a wireless device previously attached to a spoke of a hub-and-spoke mobile VPN topology. Extended BGP UPDATE message 700 may represent an example instance of reverse path host route withdraw message 27 illustrated in FIG. 1. For purposes of illustration, extended BGP UPDATE message 700 is illustrated using glyphs, rather than with packet fields.

MP-UNREACH-NLRI 702 of extended BGP UPDATE message 700 specifies an Address Family Identifier (AFI) 704 of 1 in this example to indicate IPv4 network addresses, along with a value for the Subsequent AFI (SAFI) 706 of 241 to identify delay NLRI 608 as carrying timing information. AFI 704 and SAFI 706 may in some instances have different values, as assigned by a private party or by the Internet Assigned Numbers Authority (IANA).

Reverse Path Network Layer Reachability Information (NLRI) 708 specifies a host route for the wireless device having IP address 10.1.0.65, identified in prefix 710C and assigned to facilitate access to network services by a cellular access network. Route distinguisher 710B is associated with a mobile VPN, such as mobile VPN 18 of FIG. 1, and label 710A specifies an MPLS label for an LSP from a hub PE router of the mobile VPN toward a spoke PE router to which the wireless device was previously attached. Reverse Path NLRI 708 includes reverse field 710D with a set flag to indicate that extended BGP UPDATE message 700 is a reverse path host route withdraw message. A router that receives extended BGP UPDATE message 700 removes the host route prefix 710C advertised as unreachable and forwards a representation of extended BGP UPDATE message 700 to one or more next hops (now stale) for host route prefix 710C as indicated in a routing information base of the router.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   determining, by a first router, a route programming time for programming a forwarding component of the first router with a first route for a network address; and
   sending, from the first router to a second router and prior to the first router completing programming of the first route to the forwarding component of the first router, a route advertisement that includes a second route for the network address and also includes timing information to delay the second router from programming the second route based on a route programming time for programming the forwarding component of the first router.

2. The method of claim 1,
   wherein the route advertisement comprises a Border Gateway Protocol (BGP) UPDATE message,
   wherein the BGP UPDATE message comprising a delay Network Layer Reachability Information (NLRI) that includes:
   a delay field specifying the timing information; and
   a prefix field specifying the network address for which programming the first route is to be delayed by the second router based on the timing information.

3. The method of claim 1,
   receiving, by the first router after completing programming of the first route to the forwarding component of the first router, a network packet destined to the network address; and
   forwarding, by the forwarding component of the first router, the network packet based on the route for the network address programmed to the forwarding component.

4. The method of claim 1, wherein the route advertisement comprises a first route advertisement, and the timing information comprises first timing information, the method further comprising:
   receiving, by the first router from a third router, a second route advertisement that includes the first route for the network address and also includes second timing information to delay the first router from programming the first route to the forwarding component of the first router; and
   generating, by the first router, the first timing information based on the second timing information and the route programming time for programming the forwarding component of the first router.

5. The method of claim 4, further comprising:
   initiating, by the first router, programming the forwarding component of the first router with the first route at a time that is based on a difference between a delay time defined at least in part by the second timing information and the route programming time for programming the forwarding component of the first router.

6. The method of claim 4, wherein the second timing information specifies a first absolute time at which a forwarding component of the third router will be programmed with a route for the network address, the method further comprising:
   determining, by the first router, a second absolute time at which the first router will have completed programming of the forwarding component of the first router with the first route,
   wherein the timing information specifies a maximum of the first absolute time and the second absolute time.

7. The method of claim 1, further comprising:
   determining, by the first router, the route programming time for programming the forwarding component of the first router by:
      issuing, at a first time, a route update directing the forwarding component of the first router to program a route to forwarding information associated with the forwarding component of the first router;
      receiving, at a second time, a route update acknowledgement from the forwarding component of the first router; and
      determining the route programming time based on a difference between the first time and the second time.

8. The method of claim 1, further comprising:
   receiving, by the second router from the first router, the route advertisement; and
   initiating, by the second router, programming a forwarding component of the second router with the second route at a delay time defined at least in part by the timing information included in the route advertisement.

9. The method of claim 1, wherein the timing information comprises the route programming time for programming the forwarding component of the first router.

10. A first router comprising:
    a forwarding component comprising a programmable integrated circuit;
    one or more processors operably coupled to a memory; and
    a routing protocol module configured for execution by the one or more processors to:
       determine a route programming time for programming the forwarding component with a first route for a network address; and
       send, to a second router and prior to the first router completing programming of the first route to the forwarding component, a route advertisement that includes a second route for the network address and also includes timing information to delay the second router from programming the second route based on a route programming time for programming the forwarding component.

11. The first router of claim 10,
wherein the route advertisement comprises a Border Gateway Protocol (BGP) UPDATE message,
wherein the BGP UPDATE message comprising a delay Network Layer Reachability Information (NLRI) that includes:
a delay field specifying the timing information; and
a prefix field specifying the network address for which programming the first route is to be delayed by the second router based on the timing information.

12. The first router of claim 10,
wherein the routing protocol module is further configured to receive, after completing programming of the first route to the forwarding component of the first router, a network packet destined to the network address,
wherein the forwarding component is configured to forward the network packet based on the route for the network address programmed to the forwarding component.

13. The first router of claim 10,
wherein the route advertisement comprises a first route advertisement, and the timing information comprises first timing information, and
wherein the routing protocol module is further configured to:
  receive, from a third router, a second route advertisement that includes the first route for the network address and also includes second timing information to delay the first router from programming the first route to the forwarding component of the first router; and
  generate the first timing information based on the second timing information and the route programming time for programming the forwarding component of the first router.

14. The first router of claim 13,
wherein the routing protocol module is further configured to initiate programming the forwarding component of the first router with the first route at a time that is based on a difference between a delay time defined at least in part by the second timing information and the route programming time for programming the forwarding component of the first router.

15. The first router of claim 13,
wherein the second timing information specifies a first absolute time at which a forwarding component of the third router will be programmed with a route for the network address,
wherein the routing protocol module is further configured to determine a second absolute time at which the first router will have completed programming of the forwarding component of the first router with the first route,
wherein the timing information specifies a maximum of the first absolute time and the second absolute time.

16. The first router of claim 10, wherein the routing protocol module is further configured to determine the route programming time for programming the forwarding component:
issuing, at a first time, a route update directing the forwarding component of the first router to program a route to forwarding information associated with the forwarding component of the first router;
receiving, at a second time, a route update acknowledgement from the forwarding component of the first router; and
determining the route programming time based on a difference between the first time and the second time.

17. A first router comprising:
a forwarding component comprising a programmable integrated circuit;
one or more processors operably coupled to a memory; and
a routing protocol module configured for execution by the one or more processors to:
  receive, from a second router, a route advertisement that includes a route for a network address and also includes timing information to delay the first router from programming the route; and
  initiate programming the forwarding component with the route at a time defined at least in part by the timing information included in the route advertisement.

18. The first router of claim 17,
wherein the timing information specifies an absolute time at which the second router will be programmed with the route for the network address, and
wherein the time is the absolute time.

19. The first router of claim 17,
wherein the timing information specifies a delay time to delay initiating programming of the forwarding component, and
wherein the routing protocol module is further configured to, in response to receiving the route advertisement, wait the delay time until the time before initiating programming the forwarding component with the route.

* * * * *